US011081102B2

(12) United States Patent
Chen et al.

(10) Patent No.: US 11,081,102 B2
(45) Date of Patent: Aug. 3, 2021

(54) SYSTEMS AND METHODS FOR COMPREHENSIVE CHINESE SPEECH SCORING AND DIAGNOSIS (71) Applicant: Ponddy Education Inc., San Jose, CA (US)

(72) Inventors: Franz C. Chen, San Jose, CA (US); Ming Lung Chen, Fremont, CA (US); George Yang, Sunnyvale, CA (US); Chen-Wen Chung, Taipei (TW); Ke-Chih Ning, New Taipei (TW)

(73) Assignee: Ponddy Education Inc., San Jose, CA (US)

( * ) Notice: Subject to any disclaimer, the term of this patent is extended or adjusted under 35 U.S.C. 154(b) by 243 days.

(21) Appl. No.: 16/542,760

(22) Filed: Aug. 16, 2019

(65) Prior Publication Data

US 2021/0050001 A1   Feb. 18, 2021

(51) Int. Cl.
*G10L 15/05* (2013.01)
*G10L 15/16* (2006.01)
*G06N 20/00* (2019.01)
*G06N 3/08* (2006.01)
*G06F 40/205* (2020.01)
*G06F 40/284* (2020.01)

(52) U.S. Cl.
CPC ............ *G10L 15/05* (2013.01); *G06F 40/205* (2020.01); *G06F 40/284* (2020.01); *G06N 3/08* (2013.01); *G06N 20/00* (2019.01); *G10L 15/16* (2013.01)

(58) Field of Classification Search
CPC ..... G06F 40/205; G06F 40/284; G06N 20/00; G06N 3/08; G09B 19/06; G09B 19/04; G10L 2015/025

USPC .................................. 704/231–257, 270–276
See application file for complete search history.

(56) References Cited

U.S. PATENT DOCUMENTS

| 8,744,856 | B1 * | 6/2014 | Ravishankar | .......... | G09B 19/04 |
| | | | | | 704/270 |
| 2004/0006468 | A1 * | 1/2004 | Gupta | .................... | G10L 15/10 |
| | | | | | 704/254 |
| 2005/0026118 | A1 * | 2/2005 | Chen | ......................... | G09B 7/02 |
| | | | | | 434/159 |
| 2009/0258333 | A1 * | 10/2009 | Yu | .......................... | G09B 19/06 |
| | | | | | 434/157 |
| 2011/0123965 | A1 * | 5/2011 | Yu | .......................... | G09B 19/04 |
| | | | | | 434/156 |

(Continued)

*Primary Examiner* — Jesse S Pullias
(74) *Attorney, Agent, or Firm* — Rimon Law, P.C.

(57) ABSTRACT

Systems and methods for scoring spoken Chinese are provided. In an exemplary method, a user reads a written transcript and the user's voice is recorded. Characters of the transcript are then represented as pinyins with tone markings. The voice recording is sectioned into individual phonemes that are aligned with the phonemes of the pinyins. For each character of the transcript, a tone is determined for the phonemes in the voice recording corresponding to that character. That tone is scored as correct or incorrect by comparison to the tone marking associated with the pinyins for that character. The pronunciation of each phoneme of the voice recording is also scored relative to the corresponding phonemes of the pinyins of the characters of the transcript. Further scores for words and sentences can be developed from the tone and pronunciation scores and provided to the user with feedback.

14 Claims, 7 Drawing Sheets

(56) References Cited

U.S. PATENT DOCUMENTS

2014/0195239 A1* 7/2014 Evanini .................. G10L 25/60
                                                      704/254
2018/0366111 A1* 12/2018 Jang ...................... G09B 19/04
2020/0013390 A1* 1/2020 Wang ..................... G06N 3/04

* cited by examiner

FIG. 4 target phoneme: wu
log likelihoods for all phonemes: {'sil': -1.05, 'a': -10.91, 'ai': -6.34, 'an': -11.83, 'ang': -8.36, 'ao': -4.32, 'b': -3.14, 'chi': -6.74, 'ci': -7.66, 'd': -4.95, 'e': -5.88, 'eh': -6.88, 'ei': -8., 'ei': -7.88, 'eng': -3.70, 'er': -6.61, 'f': -6.24, 'h': -12.05, 'j': -11.47, 'k': -9.14, 'l': -2.85, 'm': -5.76, 'n': -6.85, 'o': -5.16, 'p': -4.94, 'q': -9.33, 'ri': -12.87, 'shi': -9.93, 'si': -7.83, 't': -8.01, 'wu': -4.04, 'x': -9.70, 'yi': -9.45, 'yu': -2.15, 'zhi': -7.45, 'zi': -4.31}

FIG. 5 target phoneme: en
log likelihoods for all phonemes: {'sil': -6.88, 'a': -2.81, 'ai': -4.63, 'an': -1.18, 'ang': -0.16, 'ao': -5.30, 'b': -7.78, 'chi': -10.75, 'ci': -9.91, 'd': -6.23, 'e': -10.05, 'eh': -6.43, 'ei': -5.4, 'en': -3.59, 'eng': -4.67, 'er': -1.04, 'f': -7.73, 'g': -8.93, 'h': -11.54, 'j': -8.82, 'k': -7.46, 'l': -4.03, 'm': -4.94, 'n': -1.38, 'o': -6.75, 'ou': -4.22, 'p': -9.92, 'q': -7.80, 'ri': -5.14, 'shi': -6.07, 'si': -10.11, 't': -7.72, 'wu': -3.72, 'x': -9.41, 'yi': -2.79, 'yu': -6.97, 'zhi': -8.66, 'zi': -8.03}

SYSTEMS AND METHODS FOR COMPREHENSIVE CHINESE SPEECH SCORING AND DIAGNOSIS

BACKGROUND

Field of the Invention

The invention is in the field of speech scoring and more particularly to speech scoring in the context of tonal languages.

Related Art

Chinese is a tonal language, it uses pitch to distinguish lexical meaning. Chinese pronunciation consists of both phonetic and tonal features. In terms of phonetic features, each syllable consists of an initial, possibly a middle, and a final. There are five tones in Chinese Mandarin. Chinese words may consist of multiple characters, and word boundaries are implicitly inferred by speakers. Word boundaries and contexts are required information to decide the correct character pronunciation.

Speech scoring evaluates how well a language is being spoken by having users narrate a set of sentences. Speech scoring employs computers to evaluate phonetic quality (initials, middles, and finals), and tonal quality, through the process of recognition of spoken language corresponding to known texts. However, many existing speech scoring technologies do not separately deal with the tonal features, but treat tonality as part of the phonetic features. This can yield poor and unreliable results for Chinese speech scoring tasks.

Additional issues with existing speech scoring technologies include that they give only numeric scores but not practical feedback. Polyphonic characters in Chinese pose another challenge for accurate speech scoring as their pronunciations may change, depending on the context. Existing IPA-based (International Phonetic Alphabet) phoneme sets can be too fine-grained for Chinese speech scoring. Further, the existence of compound-vowel finals in Chinese further complicates accurate Chinese speech scoring.

The International Phonetic Alphabet (IPA) is used for phonetic and phonemic transcription of any language. Hanyu IPA is the most common phonetic annotation phoneme set used for most automatic speech recognition tasks. Hanyu IPA uses IPA to represent the initials, middles and finals of Mandarin pronunciation, but not the tones. Most Mandarin initials and middles generally preserve the one-to-one mapping relation to IPA. However, some Mandarin finals require a gliding vowel, for example, ong, ang, ao, and au, a combination of two adjacent vowel sounds within the same syllable. Thus, IPA phoneme and final mapping is not one-to-one because some finals will be part of other finals.

Mandarin polyphonic characters present further challenges as one character may have two or more pronunciations, which can vary both phonetically and tonally, and the different pronunciations usually have different meanings. The inference of correct pronunciations for such characters usually relies on contextual information, which includes lexical meanings and tone change rules.

SUMMARY

The present invention resolves the unique aspects of Chinese speech scoring by treating phonetic and tonal features as two different aspects that are handled separately. In exemplary methods the performance measures of these two aspects are combined, and diagnostic feedback is provided. A one-to-one mapping of phone to Chinese finals guarantees clear cuts among all Chinese finals. A heuristic pinyin labeler solves the polyphonic character problem and provides more accurate machine-generated phonetic annotations for polyphonic words. By enforcing one-to-one phoneme and final mapping, compound-vowel finals mispronunciation can be detected.

DETAILED DESCRIPTION OF THE INVENTION

The present invention is directed to systems and methods for assisting people improve their spoken Chinese and other tonal languages. In an exemplary method, a user reads a transcript in the language and the user's voice is recorded in a digital recording. The transcript is then analyzed and the characters of the transcript are then represented as pinyins with tone markings. The voice recording is sectioned into individual phonemes that are aligned with the phonemes of the pinyins of the characters of the transcript. For each character of the transcript, a tone is determined for the phonemes in the voice recording corresponding to that character. That tone is compared to the tone marking associated with the pinyins for that character. If the tones match then the tone is scored as correct, otherwise the tone is scored as incorrect. Each phoneme of the voice recording is scored for goodness of pronunciation relative to the corresponding phonemes of the pinyins of the characters of the transcript. From the tone scores and goodness of pronunciation scores for the phonemes various scores for characters, words, and sentences can be developed. These scores are provided to the user, potentially with feedback for improvements.

Figure 1:
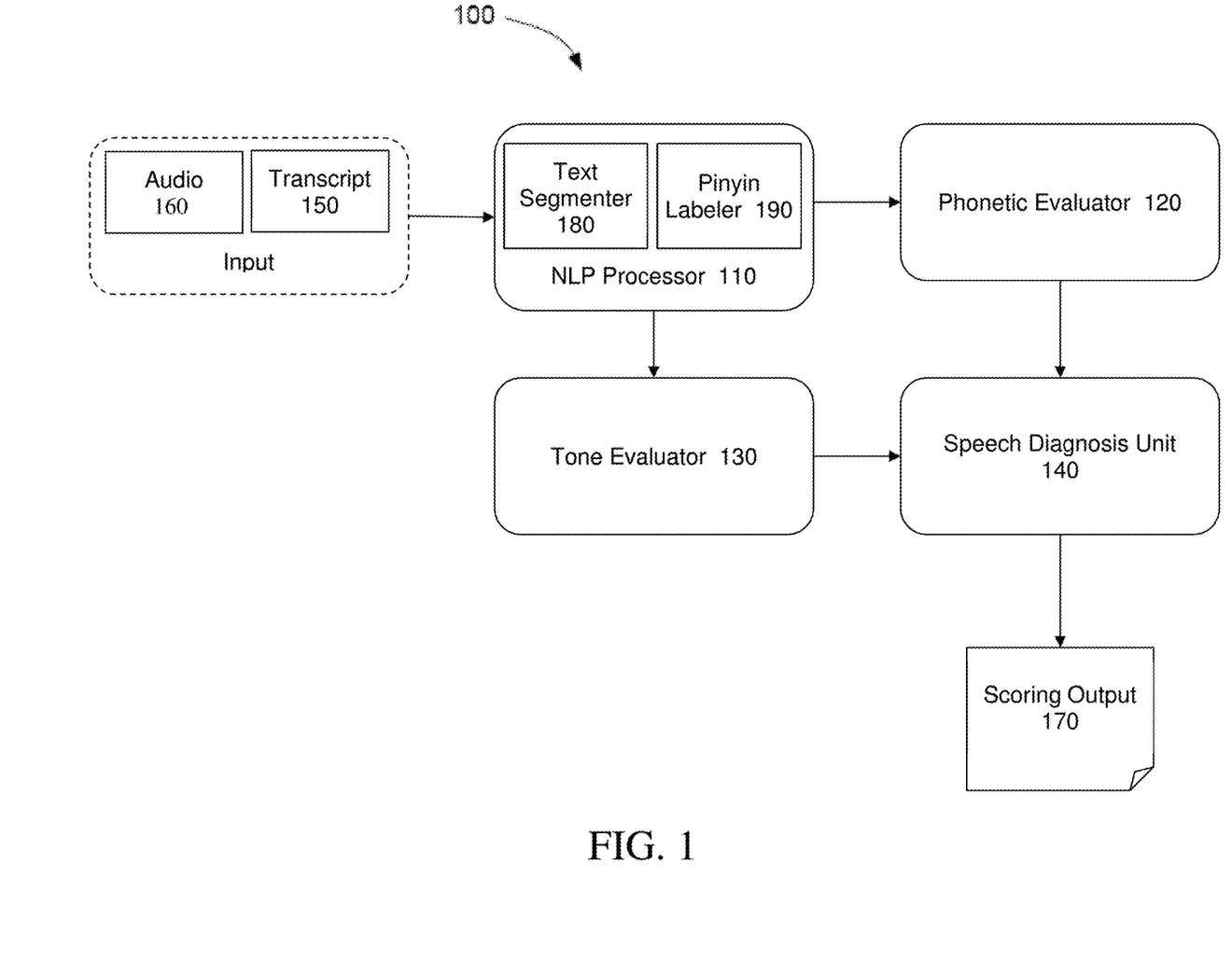
FIG. 1 shows an exemplary architecture for a speech scoring system according to various embodiments of the present invention.

FIG. 1 is a schematic representation of an exemplary architecture for an automatic speech scoring system 100. The system 100 can be hosted on a server, for example, and can communicate with multiple client devices over a network such as the Internet. Suitable client devices include personal computers and smartphones including a display and a microphone and running a client application. The system 100 includes a processor and non-transitory memory storing computer-readable instructions that when executed by the processor cause the system 100 to perform the steps described below.

The system 100 includes several modules including a Natural Language Processing (NLP) processor 110, a phonetic evaluator 120, a tone evaluator 130, and a speech diagnosis unit 140. In operation, a person reads from a transcript 150 and the person's voice is recorded as an audio file 160, typically in a standard digital audio format such as .WAV. The transcript 150 can be supplied by the system 100 and sent to the application on the client device, or can be entered into the application by the user, in various embodiments. The transcript 150, and the recorded audio 160 of the person reciting the characters of the transcript 150, are sent from the client device to the system 100 and become the two inputs that are received by the NLP processor 110. The NLP processor 110 outputs to the phonetic evaluator 120 and the tone evaluator 130 in parallel, and each of these then feed into the speech diagnosis unit 140. The speech diagnosis unit 140 provides a scoring output 170 for the audio 160. Each of these will be discussed in greater detail, below. Scoring output 170 is then returned from the system 100 to the client device for the application to display to the user.

NLP processor 110 includes a text segmenter 180 and a pinyin labeler 190. The text segmenter 180 receives the transcript 150 as text, for instance as raw Chinese characters, and performs text segmentation thereon, as discussed in greater detail with respect to FIG. 2. The segmented text is then provided to the pinyin labeler 190, as further illustrated by FIG. 3, to get pronunciation ground truth for scoring in the form of correlated tone and phonetic information, which are sent to the tone evaluator 120 and phonetic evaluator 130, respectively. The pinyin labeler 190 outputs character level pinyin.

Figure 2:
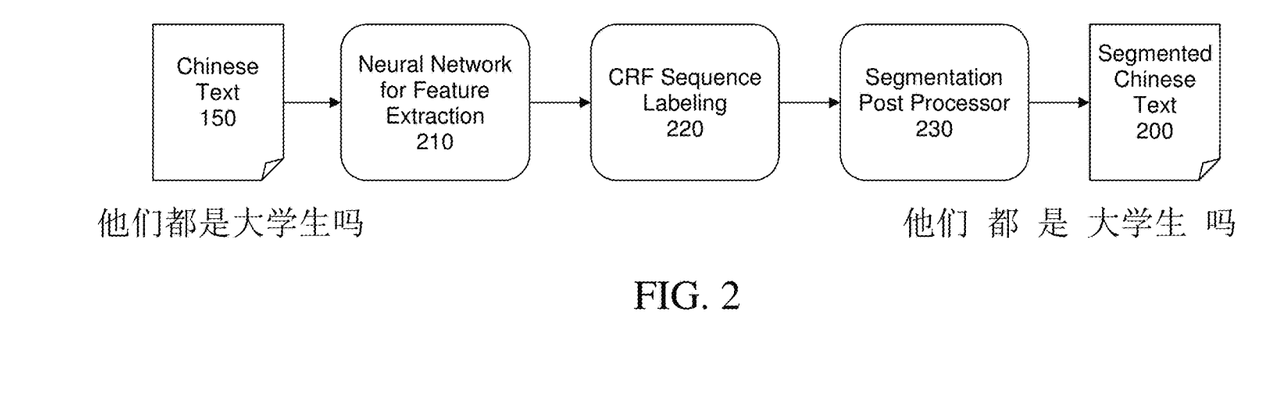
FIG. 2 is a schematic representation of an exemplary method performed by a text segmenter according to various embodiments of the present invention.

With reference to FIG. 2, text segmenter 180 receives raw Chinese text, such as transcript 150, as an input and outputs a space-separated segmented text 200. An example of a sentence in Chinese ("Are they all college students?") is shown below Chinese text 150. Text segmenter 180 is a machine learning model that has been previously trained on a large corpus of human-annotated segmented text. In one embodiment, the machine learning model is trained on a corpus of Chinese transcripts 150 where each of the Chinese characters of each transcript 150 has been labeled with one of four labels. The four labels (B, M, E, S) denote characters that are beginnings, middles, ends, and singletons.

Text segmenter 180 employs a series of layers. A first layer 210 employs a neural network to automatically extract from the transcript 150 features that can be useful for deciding word boundaries. Exemplary suitable neural networks include recurrent neural networks (RNNs) and Convolution Neural Networks (CNNs). Both CNNs and RNNs are able to capture the context clues (i.e. the adjacent characters) and use them to decide word boundaries at a lower computation cost as compared to the common use of n-grams as features.

A second layer 220, then performs sequence labeling and identifies word boundaries through the use, for example, of a Conditional Random Field algorithm or Hidden Markov Model (HMM). The sequence labeling assigns one of the four labels to each of the characters of the transcript 150 using the trained machine learning model. Word boundaries are identified after each ending character and after every singleton character. The Stanford Parser (Chinese) and the Bidirectional LSTM-CRF models for sequence tagging are examples of suitable models for performing layers 210 and 220.

A third layer 230, the segmentation post processor, adjusts errors from the output of the second layer 220 through the use, for example, of expert compiled rules and dynamic programming. Third layer 230 outputs the space-separated segmented text 200. An example of segmented Chinese text obtained from the initial Chinese sentence is shown below segmented Chinese text 200 in FIG. 2. The segmented Chinese text 200 is represented by added spaces between characters that individually, or collectively, form words or terms, such as 大学生 for "college students" and 吗 to represent that the sentence is a question.

Figure 3:
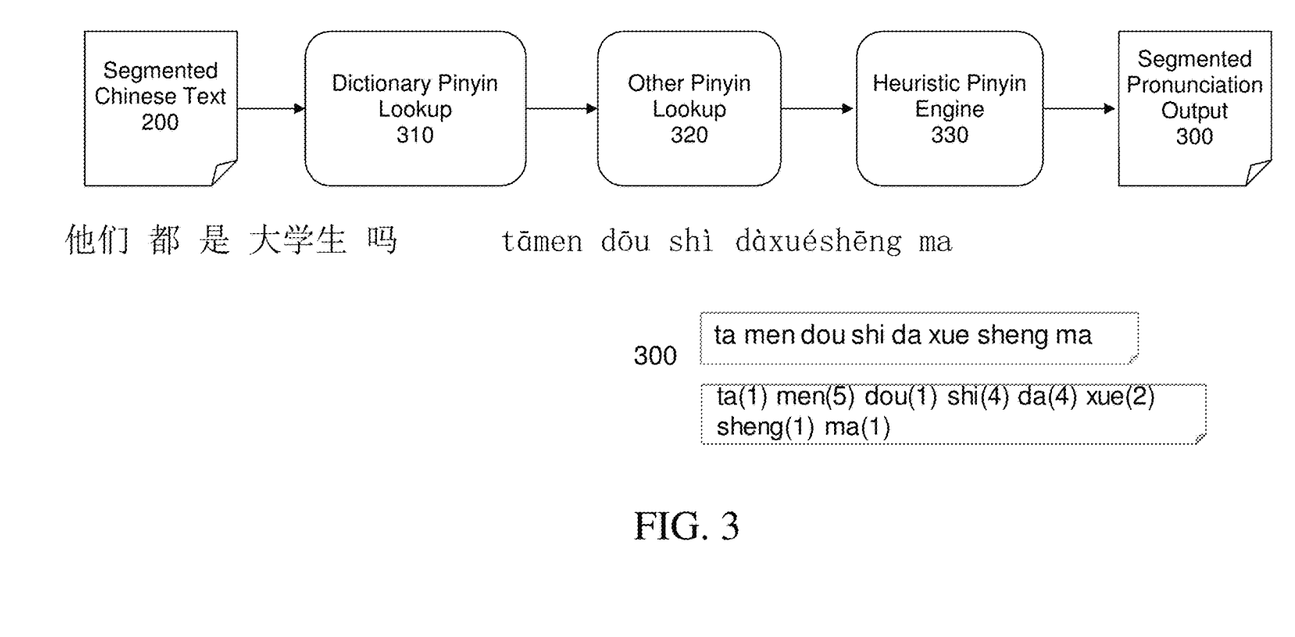
FIG. 3 is a schematic representation of an exemplary method performed by a pinyin labeler according to various embodiments of the present invention.

Pinyin labeler 190 receives the segmented text 200 as input and outputs the corresponding pronunciation as segmented pronunciation output 300 including a pinyin representation of the segmented text 200. With reference to FIG. 3, pinyin labeler 190 similarly employs a series of layers. A first layer 310 looks up words pre-defined in a pre-defined dictionary and obtains their pinyin representations. A second layer 320 finds pinyins for other words not in the pre-defined dictionary. A sufficiently comprehensive dictionary will include most every word likely to be present in the segmented text 190, so the second layer 320 in normal operation will have little to do. However, unrecognized words will be treated as singletons (i.e. each character as one word). In some embodiments, second layer 320 chooses a pinyin with the highest occurrence probability in these instances. For example, 90% of the time when the character 都 occurs, it's pronounced as "dōu"; only 10% of the time it's pronounced as "dū". Therefore, in assigning pinyin to this singleton, second layer 320 favors "dōu" over "dū."

An exemplary output of the second layer 320 for the given segmented text 200 is shown below other pinyin lookup 320. A third layer 330, such as a heuristic pinyin engine, then employs an RNN sequence-to-sequence (seq2seq) model, for example, to handle the polyphonic character problem. The third layer 330 outputs the segmented pronunciation output 300, including pinyins and tones for each of the characters in the transcript 150. In various embodiments, the segmented pronunciation output 300 can comprise two files, a tone-mark-free version as the input for the phonetic evaluator 120, and a tone-marked version as the input for the tone evaluator 130, both illustrated in FIG. 3.

With reference again to FIG. 1, the phonetic evaluator 120 receives the audio 160 and the tone-mark-free version of the segmented pronunciation output 300 as inputs and then outputs phoneme-level goodness of pronunciation (GOP) scores. In some embodiments, the audio 160 is received directly by the phonetic evaluator 120 without first passing through the NLP processor 110. The phonetic evaluator 120 is a trained machine learning model, for instance, an acoustic model, that locates transcription words, as represented by segmented pronunciation output 300, in the input audio 160, at the granularity of phonemes, and produces a GOP estimation for each phoneme. Suitable methodologies for estimating GOP for each phoneme include CMU Sphinx, Julius, Kaldi, HTK. A specific example is given below with respect to FIG. 4.

The quality of the training corpus is significant to the performance of phonetic evaluator 120. A corpus consisting of an approximate balance (roughly 50/50) between China-accent and Taiwan-accent audio files, produces a model that is well able to detect mispronunciations while tolerating the accent differences. In various embodiments the ratio of China-accent to Taiwan-accent can vary between 45/55 to 55/45. Another significant factor is the choice of a phoneme set for the acoustic model training to distinguish differences among phonemes in the acoustic model training stage for the speech diagnosis unit 140. By contrast to conventional IPA phoneme and final mapping which is not one-to-one, according to the present invention one-to-one phoneme and final mapping is enforced to ensure no final phoneme is part of another final.

Figure 4:
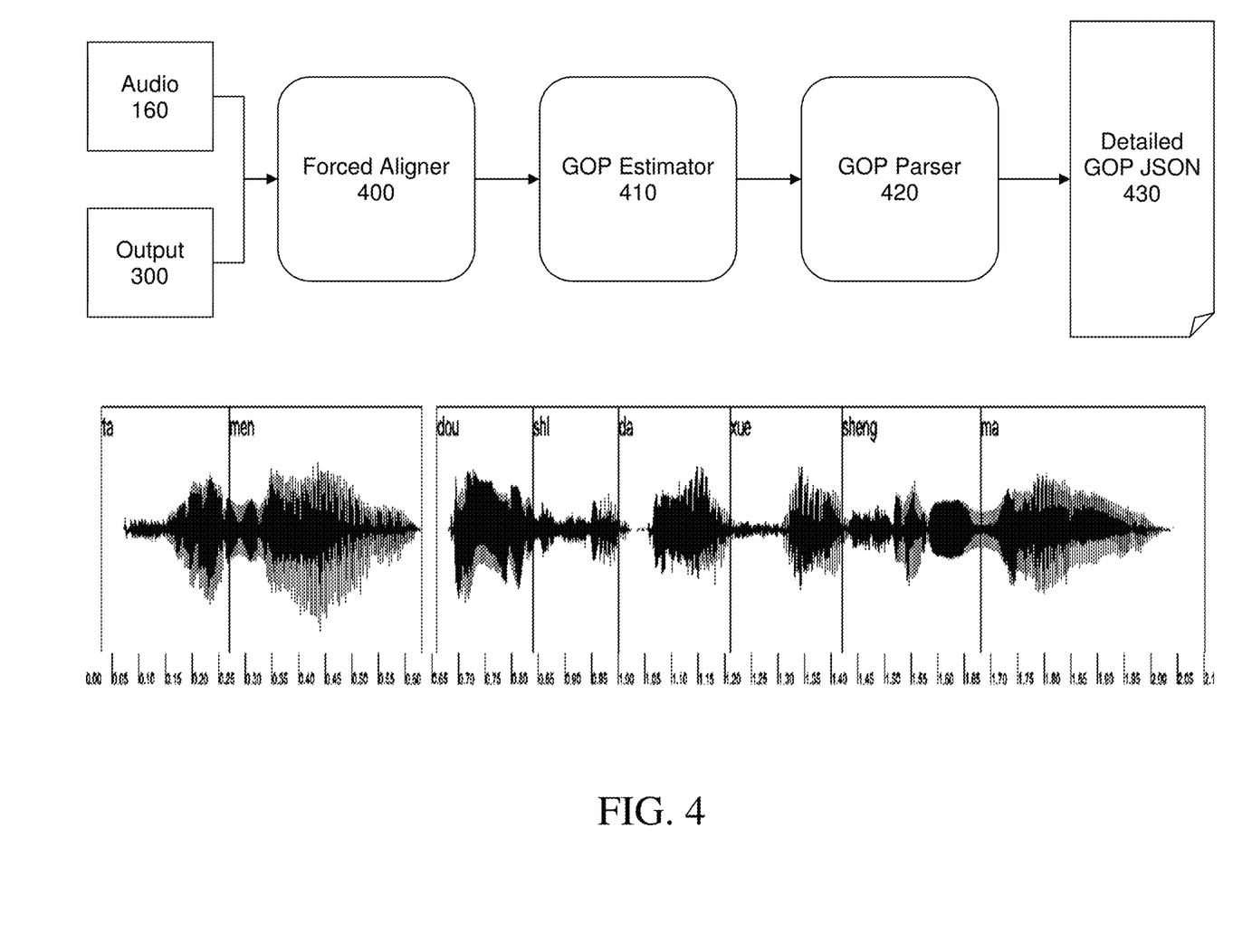
FIG. 4 is a schematic representation of an exemplary method performed by a phonetic evaluator according to various embodiments of the present invention.

FIG. 4 illustrates an exemplary process that can be implemented by the phonetic evaluator 120. Audio 160 and the segmented pronunciation output 300 are provided to a forced aligner 400 to determine the phoneme boundaries in the audio 160 to identify successive individual phonemes between the boundaries. GOP estimator 410 then analyzes how well each phoneme was pronounced and generates a numeric score for each. GOP parser 420 collects together the phoneme scores, phoneme boundaries, character boundaries, and word boundaries and outputs in JSON format, for example, for use by the speech diagnosis unit 140.

The forced aligner 400 is a machine-learning-trained unit which recognizes phonemes and marks their beginning and end times in the audio 160. Forced aligner 400 segments the audio 160 into phonemes by analyzing features such as noise ratios, the lengths of sounds, relative powers, filter matches, Mel-frequency cepstral coefficients (MFCCs), and so forth. An exemplary representation of the audio 160 is shown below the process of FIG. 4, where the audio 160 corresponds to an audio recording of a recitation of the transcript 150 by a user. In some embodiments, forced aligner 400 includes an MFCC extractor.

The MFCC extractor sections the audio 160 into overlapping frames, then performs a first fast Fourier transform (FFT) to convert the audio signal within each frame from the time domain into the frequency domain. The frequency domain output of the first FFT is next converted into a scale that relates the perceived frequency of a phoneme to the actual measured frequency, such as the Mel scale. The Mel scale scales the frequency in order to match more closely what the human ear can hear. This conversion can be performed, for example, by a filter bank. The MFCC extractor then takes natural logarithms (logs) of the rescaled frequency domain output and performs a second FFT to return the output to the time domain, yielding a series of Cesptral coefficients which represent rates of change in spectral bands. These cepstral coefficients accurately represent the shape of the human vocal tract (tongue, teeth, mouth width, etc.).

With reference to the illustrated example of the segmented pronunciation output 300 of FIG. 3, the forced aligner 400 expects a particular first pinyin, "ta," consisting of two phonemes, "t" and "a." From the training, the forced aligner 400 expects the phoneme "t" to have Cepstral coefficients similar to (4.23 1.689 10.872 145.26 0.871 9.994 862.5). The forced aligner 400 therefore searches the audio 160 for a first instance of a phoneme which is sufficiently similar to the expected series of coefficients. In this example, the MFCC extractor of the forced aligner 400 determines that a phoneme located between 0.03 seconds and 0.17 seconds in the audio 160 has Cepstral coefficients (4.26 1.721 10.83 143.5 0.69 9.152 850.32) that closely matches the expected first phoneme with a confidence level that exceeds a threshold and therefore forced aligner 400 labels the phoneme between 0.03 seconds and 0.17 seconds as the expected phoneme "t." The next expected phoneme would be the "a" of "ta" which can be similarly located and labeled between 0.17 seconds and 0.27 seconds. In this way, each of the individual phonemes of the audio 160 is represented by a time-delineated section of the audio 160. This time-boundary information is sometimes provided in Conversation Time Marked (CTM) formatted files.

GOP estimator 410 analyzes how well each phoneme was pronounced and generates a numeric score for each. In an exemplary embodiment the equation to calculate goodness of pronunciation (GOP) for a given phoneme p is:

$$GOP(p) = \log \frac{p(O^{(p)}|p)}{\max_{q \in Q} p(O^{(p)}|q)}, -\infty < GOP \le 0.$$

In the above equation, the numerator is the observed probability for a given target phoneme, which is also the logarithm of the likelihood (the log likelihood) for the target phoneme. The denominator in the equation is the maximum observed probability given each phoneme, or in other words, the maximum from the log likelihoods for all phonemes.

Figure 5:
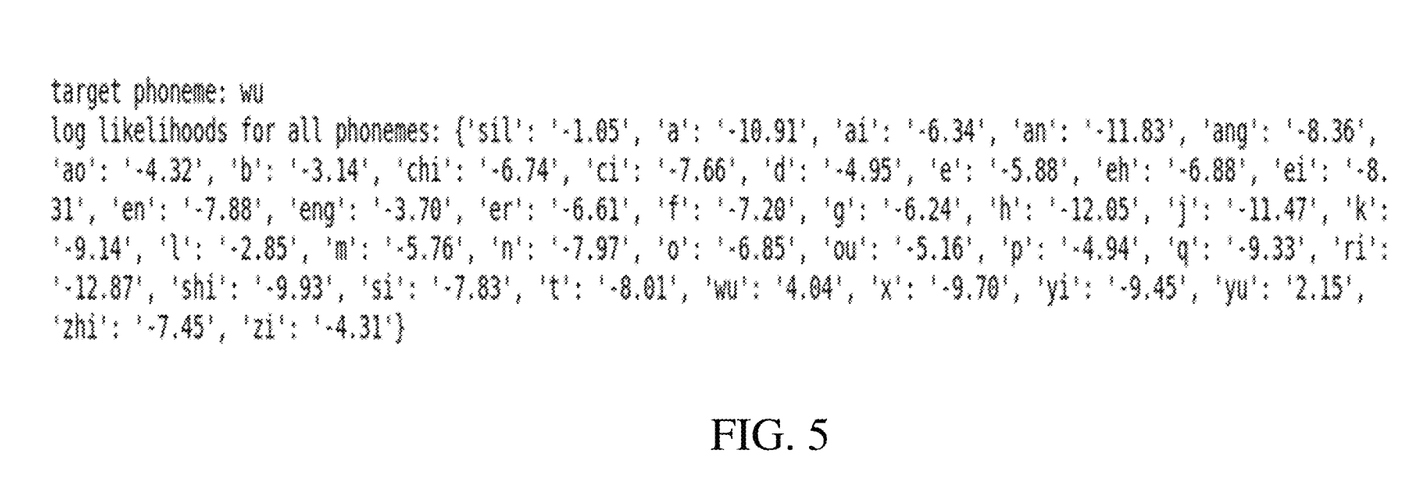
FIG. 5 is a table of values representing the likelihood that a target phoneme was the phoneme enunciated in an audio recording, where the person correctly enunciated the target phoneme.
Figure 6:
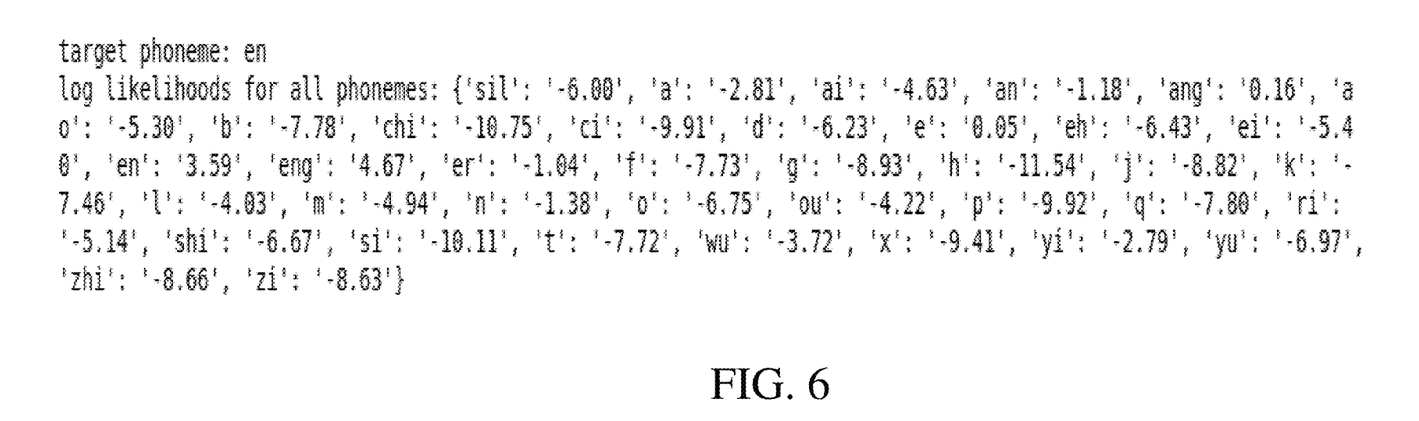
FIG. 6 is a table of values representing the likelihood that a target phoneme was the phoneme enunciated in an audio recording, where the person incorrectly enunciated the target phoneme.

FIGS. 5 and 6 illustrate observed probabilities, or log likelihoods, for all phonemes given two different target phonemes, "wu" and "en." In the example of FIG. 5 the speaker correctly pronounced "wu" while in the example of FIG. 6 the speaker incorrectly sounded a similar phoneme, "eng." In both, based on the goodness of fit of the observed Cepstral coefficients to the Cepstral coefficients for the target phoneme, different log likelihoods are determined for every possible phoneme. In these examples, "sil" represents a silence phoneme in place of an uttered phoneme.

In the illustrated examples of FIGS. 5 and 6, the values for each phoneme, being their confidence level or goodness of fit, have been scaled according to a scaling metric such that the values do not fall between 1 and 0 but still preserve a relative ranking, highest to lowest, of most likely to have been spoken to least likely to have been spoken. Thus, in FIG. 5 "wu" has a value of 4.04, the highest while the least likely phoneme, "ri," has the lowest value of −12.87. For FIG. 6, where the target was "en" but "eng" was spoken in the audio 160, "eng" has the highest value, 4.67, while the target phoneme, "en," has a lower value of 3.59.

In the example of FIG. 5, the numerator and the denominator in the GOP equation are the same (4.04) when considering p="wu" while in the example of FIG. 6, for p="en," the numerator will be 3.59 while the denominator will be 4.67. For "wu" in FIG. 5, the GOP is log(1)=0. For "en" in FIG. 6 the GOP is log(0.77)=−0.26.

Besides GOP scores, which estimate an absolute score on phonetic correctness, the phonetic evaluator 120 also produces rank ratio (RR) scores, which is a relative score estimation. In an exemplary embodiment the equation to calculate RR scores for a given phoneme p is:

$$RR(p) = \frac{\text{rank}(p) - 1}{N(\text{phonemes}) = 38}, 0 \le RR < 1.$$

Here, the phonemes in FIGS. 5 and 6 are simply ordered from most likely to least likely, such as from "wu" to "ri" in FIG. 5. Since "wu" is ranked first, RR(wu) is (1−1)/38=0. Similarly, RR(ri) is (38−1)/38=0.97. In FIG. 6, RR(eng)=0 and RR(en)=(2−1)/38=0.03. The GOP and RR scores can be further scaled to a 0-100 range according to the following functions:

$$f(p, a, b) = \frac{100}{1 + \left(\frac{RR(p)}{a}\right)^b}$$

and $$g(p, a, b) = \frac{100}{1 + \left(\frac{-GOP(p)}{a}\right)^b}$$

where a and b are empirically chosen to be 0.01 and 2, respectively, and f represents the rescaled value for RR and g represents the rescaled value for GOP. It can be seen that values of 0 in both equations return f and g of 100. For RR(ri)=0.97 in FIG. 5, the resulting f=0.01, effectively zero. For GOP(en)=−0.26 in FIG. 6 the resulting g=0.15 while RR(en)=0.03 so f=10.

These two scoring schemes each have their own advantages and disadvantages, while sometimes they complement each other's weaknesses. GOP parser 420 outputs the phoneme scores, phoneme boundaries, character boundaries, and word boundaries, for instance, in JSON format as JSON 430. It will be appreciated that JSON is used herein as an exemplary file format but others can be used. The phonetic evaluator 120 outputs all phoneme-level GOP and RR scores to the speech diagnosis unit 140.

The tone evaluator 130 receives from the NLP processor 120 the audio 160 and the tone-marked version of the segmented pronunciation output 300, evaluates only the tone, and then outputs whether the detected tone was correct, that is, consistent with the expected tone as represented by the tone-marked version of the segmented pronunciation output 300. Tone evaluator 130 is also a machine learning model, for example a classifier, trained with a corpus of human annotated tonal training data. In some embodiments, the audio 160 is received directly by the phonetic evaluator 130 without first passing through the NLP processor 110.

Figure 7:
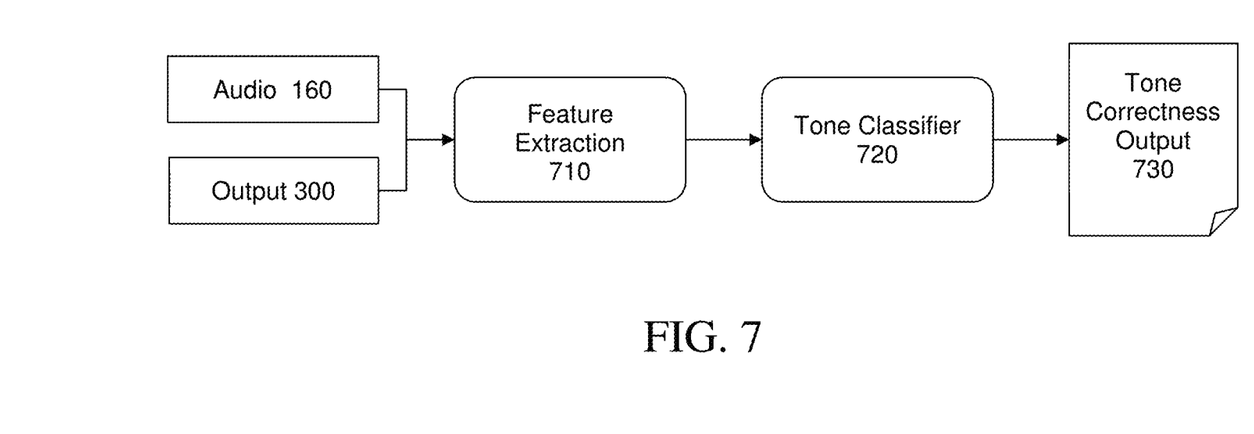
FIG. 7 is a schematic representation of an exemplary method performed by a tone evaluator according to various embodiments of the present invention.

FIG. 7 illustrates an exemplary process that can be implemented by the tone evaluator 130. A first layer 710 performs the same function as the forced aligner 400 of FIG. 4. In some embodiments, both of the phonetic evaluator 120 and the tone evaluator 130 share the same forced aligner 400.

A second layer 720, for example a tone classifier, makes predictions based on the extracted features, compares the predictions with the input tone label, and then outputs a binary indicator 730 of tone correctness. The tone classifier treats audio in MFCC representation as an image (used here to refer to a matrix of values) and uses a Convolution Neural Network, for example, to perform classification. During the training, the CNN inspects training examples and tries to see if images labeled in the same class, for example, those labeled as exhibiting the first tone, share common characteristics. During this process, parameters of the neural network are adjusted via back propagation. As used as the second layer 720, the CNN receives characters, as provided in a CTM formatted file, for example, and selects the tone that yields the highest confidence. The second layer 720 then compares the tone that was predicted for the character with the input tone label from the tone-marked version of the segmented pronunciation output 300, and then outputs a binary indicator 730 of tone correctness, either correct or incorrect.

Figure 8:
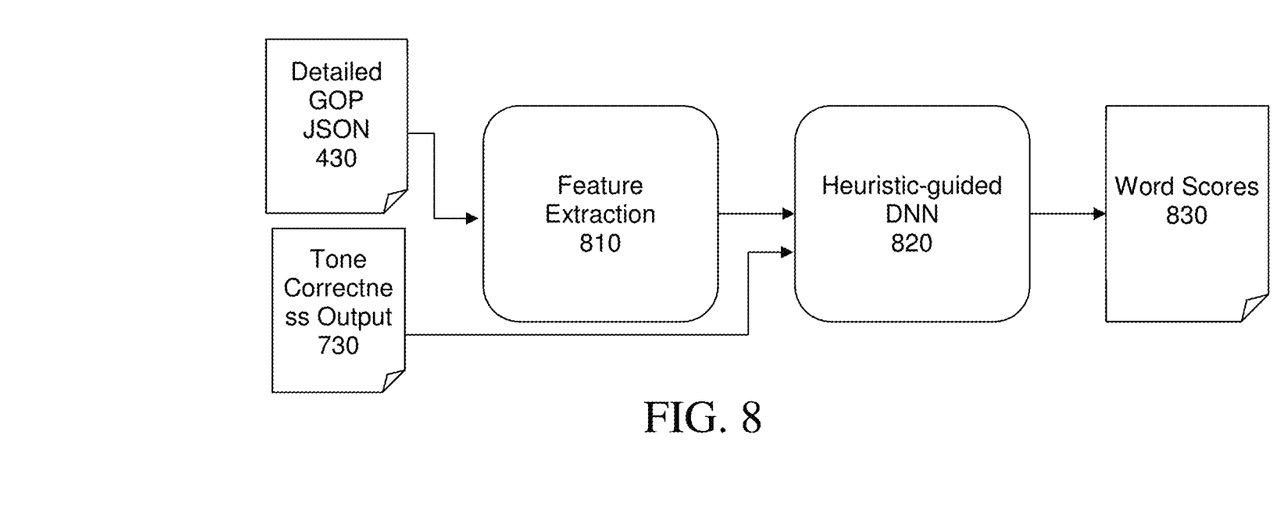
FIG. 8 is a schematic representation of an exemplary method performed by a speech diagnosis unit according to various embodiments of the present invention.

FIG. 8 illustrates an exemplary process that can be implemented by the speech diagnosis unit 140. A first layer 810 is a feature extraction layer that extracts features from the JSON output 430. Here, features can include phone-level GOP scores considering temporal locality information, phone level RR scores considering temporal locality information, correctness statistics on initials, middles and finals, and the number of pauses per second, which is a measure of fluency. Temporal locality information refers to contextual information as used herein. For example, a phoneme might be forced to alter when co-occurring with certain adjacent phonemes, so scoring can also consider adjacent phonemes for proper context.

A second layer 820, for example, a heuristic-guided Deep Neural Network (DNN) speech scorer, combines the tone correctness output 730 and the phoneme scores from output 430, and the features extracted by first layer 810. The heuristic-guided DNN speech scorer includes a deep neural network model trained with various training features to get, for example, a 3-level phonetic score for each character, though two-level scoring as well as four or more levels are possible. Three such levels can be Good, OK, and Keep Up, in order from best to least. Training labels in the training corpus come from expert annotated audio-score pairs.

The second layer 820 also determines word-level scores 830 from the character scores, where the word-level scores 830 include both phonetic word scores and tonal word scores for each word. In various embodiments, the phonetic score of a word is the minimum score of its constituent characters' phonetic scores. For example, the word 他们 consists of 他 and 们, and if one character is scored Good and the other character scored OK, then the phonetic word score for this word is OK. Similarly, the word tone score is the minimum score of its constituent characters' tone scores, such that all tones must be correct to receive a word tonal score of correct, and if the tone on any character is incorrect, then the overall word tone score is also incorrect.

Figure 9:
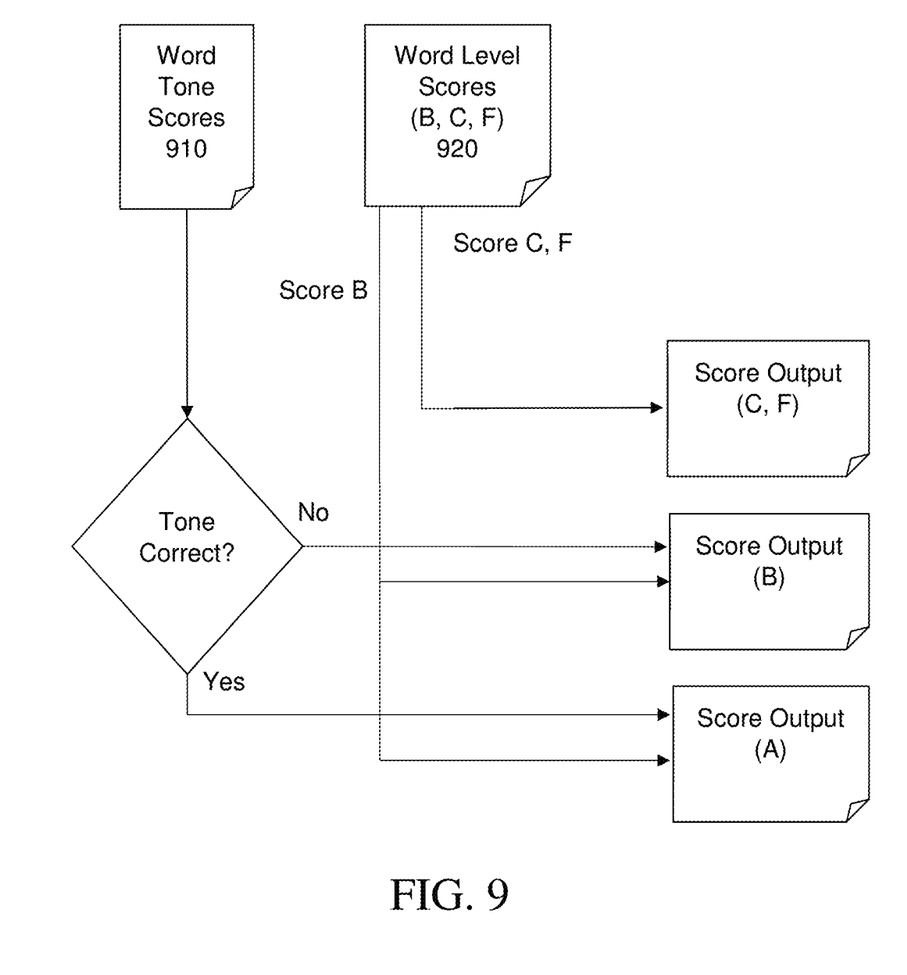
FIG. 9 is a schematic representation of an exemplary speech scoring method that considers both goodness of pronunciation scores and tonal correctness scores according to various embodiments of the present invention.

FIG. 9 illustrates an exemplary speech scoring method that can be implemented by speech scoring unit 140 and that considers both goodness of pronunciation scores and tonal correctness scores to score speech. In the exemplary qualitative scoring embodiment of FIG. 9 the method considers two inputs, the binary word tone scores 910, and the word level scores 920. In these embodiments the method employs four grades, Great, Good, OK, and Keep Up, in order from best to least, to provide an integrated score for pronunciation and tone. Word level scores 920 range from Good to OK to Keep Up as in this exemplary embodiment above, also designated B, C, and F, respectively, in FIG. 9.

In some embodiments, word tone performance is only considered when the word pronunciation score is Good. Thus, when both the tone is correct (Y) and the pronunciation is Good (B) for a character the method yields a Great score (A) and when the tone is incorrect (N) but the pronunciation is Good (B) the method yields a Good score (B). When the pronunciation is OK (C) the method yields an OK score (C), and when the pronunciation is poor the method yields a Keep Up score (F). Phone level score information is preserved as well to give users finer-grained phone level feedback.

Figure 10:
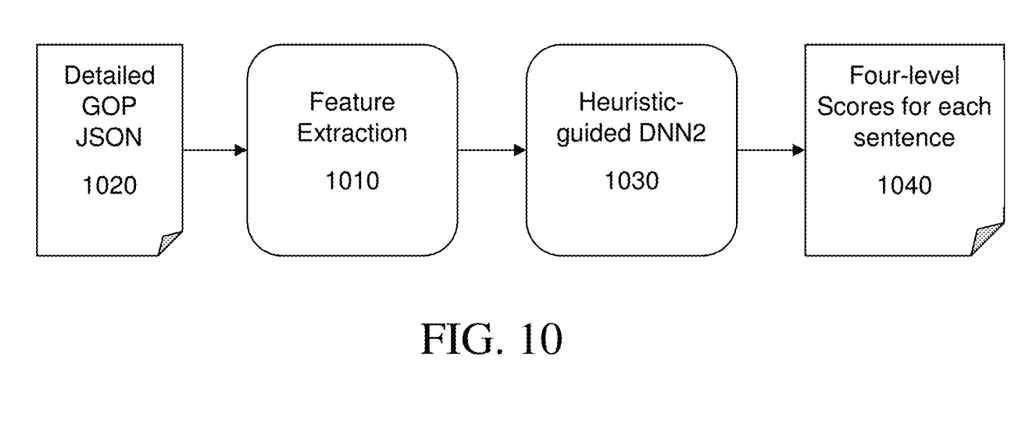
FIG. 10 is a schematic representation of an exemplary sentence scoring method performed by a speech diagnosis unit according to various embodiments of the present invention.

In various embodiments, the speech diagnosis unit 140 also determines sentence scores. FIG. 10 illustrates an exemplary sentence scoring method that can be implemented by speech scoring unit 140. In FIG. 10, a feature extraction 1010 is performed on detailed GOP information 1020 and then a second heuristic-guided DNN 1030 outputs a sentence score 1040 in a four-level scoring system, for example, such as the one given above. GOP information 1020, in some embodiments, comprises word scores 830. This classifier is trained by providing sample transcripts to professionals, and having the professionals listen to the corresponding training audios. The professionals are then shown a machine-generated overall sentence score and are asked to score the sentence into one of the four levels of the scoring system, using the reference machine-generated sentence score in close situations when deciding between two levels is difficult. The machine-generated score, in some embodiments, is the average of all phoneme scores and all character tone scores across the sentence normalized to a 0-100 scale. Based on this training, the second DNN 1030 scores sentences to output sentence scores 1040. In an exemplary embodiments, the four levels for scoring sentences are defined as follows: Great—clear articulation, fluent, with pronunciation close to that of a news reporter and no more than a 1 in 10 tolerance for mispronunciation; Good—minor errors allowed, generally fluent with no obvious accent and pronunciation close to that of regular native speakers and 2 to 3 in 10 tolerance for mispronunciation; OK—stammer or mispronunciation on polyphonic characters allowed, possibly with an accent but generally understandable to listeners, and pronunciation close to that of non-native speakers in a basic level or native speakers with a speech impairment and 4 to 6 in 10 tolerance on mispronunciation; and Keep Up for all other cases.

Figure 11:
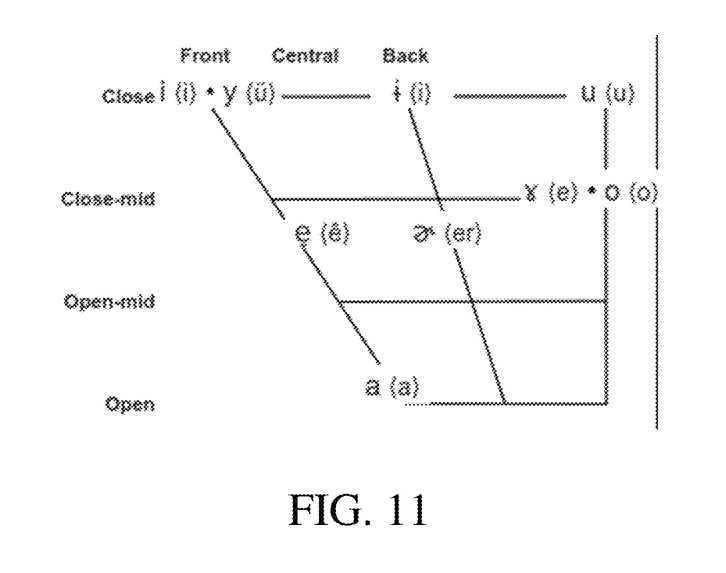
FIG. 11 shows a Chinese vowel chart.

The speech diagnosis unit 140 optionally also detects mispronunciations of phonemes and can, for a given user over time, log their errors and successes, and from this history determine error patterns, infer articulatory behaviors from these error patterns, and provide practical improvement suggestions. For instance, and with reference to FIG. 11, a practical feedback could be "the user might need to close his mouth a little bit when pronouncing the phoneme 'e' because his phoneme 'e' is often mispronounced to something close to phoneme 'a'." The speech diagnosis unit 140 optionally also uses this history to track a user's improvement over time. The Chinese vowel chart of FIG. 11 is a schematic arrangement of the vowels that provides convenient reference points for specifying tongue position. The vertical dimension is known as vowel high, which corresponds to how open the mouth is during production. The horizontal dimension includes tongue advancement and identifies how far forward the tongue is located in the oral cavity during production.

The speech diagnosis unit 140 then sends to the application interface on the client device the scoring output 170 from the server, including the word scores 630, and optionally also including an overall sentence score, and recommendations on further exercises for further improvements.

The descriptions herein are presented to enable persons skilled in the art to create and use the systems and methods described herein. Various modifications to the embodiments will be readily apparent to those skilled in the art, and the generic principles defined herein may be applied to other embodiments and applications without departing from the spirit and scope of the inventive subject matter. Moreover, in the following description, numerous details are set forth for the purpose of explanation. However, one of ordinary skill in the art will realize that the inventive subject matter might be practiced without the use of these specific details. Flowcharts in drawings are used to represent processes. A hardware processor system may be configured to perform some of these processes. Modules within flow diagrams representing computer implemented processes represent the configuration of a processor system according to computer program code to perform the acts described with reference to these modules. Thus, the inventive subject matter is not intended to be limited to the embodiments shown, but is to be accorded the widest scope consistent with the principles and features disclosed herein.

The use of the term "means" within a claim of this application is intended to invoke 112(f) only as to the limitation to which the term attaches and not to the whole claim, while the absence of the term "means" from any claim should be understood as excluding that claim from being interpreted under 112(f). As used in the claims of this application, "configured to" and "configured for" are not intended to invoke 112(f).

What is claimed is:

1. A method comprising:
    receiving, with a server, both of a transcript in a tonal language and an audio recording of a person reciting the transcript, the transcript including a number of characters of the language, the server including a processor and non-transitory memory storing computer-readable instructions that when executed by the processor cause the server to perform the steps of the method;
    segmenting the transcript into a segmented text including the characters of the transcript and spaces;
    converting the segmented text to a segmented pronunciation output including a first file having, for each character of the transcript, one or more pinyins without tone markings and a second file having, for each character of the transcript, the same pinyins with associated tone markings;
    determining phoneme boundaries within the audio recording to identify successive individual phonemes between the boundaries, and for each of these individual phonemes identifying a corresponding time-delineated section of the audio recording;
    for each pinyin of the first file, matching each phoneme thereof a corresponding time-delineated section of the audio recording;
    for each character of the transcript, determine the corresponding one or more pinyins of the second file, and determine a tone for the one or more time-delineated sections of the audio recording corresponding to the one or more pinyins of the second file;
    determining a goodness of pronunciation score for each phoneme of each pinyin of the first file by comparing that phoneme to the phoneme in the corresponding time-delineated section of the audio recording;
    determining a correctness of tone score for each character of the transcript by comparing the tone marking for the one or more pinyins for that character in the second file to the tone determined for the corresponding one or more time-delineated sections of the audio recording; and
    determining a word-level score for each word in the transcript, the word-level scores being based on the goodness of pronunciation scores and correctness of tone scores.

2. The method of claim 1 wherein segmenting the transcript into the segmented text includes identifying features in the transcript and then labeling each of the characters of the transcript.

3. The method of claim 2 wherein each of the characters of the transcript is labeled as either a beginning, middle, end, or singleton, and wherein word boundaries are identified after each ending character and after every singleton character.

4. The method of claim 1 wherein converting the segmented text to a segmented pronunciation output is performed by a heuristic pinyin engine.

5. The method of claim 4 wherein the heuristic pinyin engine employs an RNN sequence-to-sequence model.

6. The method of claim 1 wherein determining phoneme boundaries within the audio recording includes using a machine-learning unit trained to recognize phonemes to identify phonemes in the audio recording and configured to mark a beginning time and an end time in the audio recording for each identified phoneme.

7. The method of claim 6 further comprising determining Cepstral coefficients for each identified phoneme.

8. The method of claim 1 wherein determining the goodness of pronunciation score for each phoneme of each pinyin of the first file employs a logarithmic scale.

9. The method of claim 1 wherein determining the correctness of tone score for each character of the transcript includes using a trained Convolution Neural Network to classify the tone for the one or more pinyins for that character in the second file.

10. The method of claim 1 wherein determining the word-level score for each word in the transcript includes scoring the words based on a four-level scoring system.

11. The method of claim 1 further comprising determining a sentence level score for each sentence of the transcript.

12. The method of claim 1 further comprising sending the word-level scores to a client device.

13. The method of claim 12 further comprising sending feedback to the client device.

14. A system comprising:
server including a processor and non-transitory memory storing computer-readable instructions that when executed by the processor cause the server to perform the steps of receiving both a transcript in a tonal language and an audio recording of a person reciting the transcript, the transcript including a number of characters of the language;

segmenting the transcript into a segmented text including the characters of the transcript and spaces;

converting the segmented text to a segmented pronunciation output including a first file having, for each character of the transcript, one or more pinyins without tone markings and a second file having, for each character of the transcript, the same pinyins with associated tone markings;

determining phoneme boundaries within the audio recording to identify successive individual phonemes between the boundaries, and for each of these individual phonemes identifying a corresponding time-delineated section of the audio recording;

for each pinyin of the first file, matching each phoneme thereof a corresponding time-delineated section of the audio recording;

for each character of the transcript, determine the corresponding one or more pinyins of the second file, and determine a tone for the one or more time-delineated sections of the audio recording corresponding to the one or more pinyins of the second file;

determining a goodness of pronunciation score for each phoneme of each pinyin of the first file by comparing that phoneme to the phoneme in the corresponding time-delineated section of the audio recording;

determining a correctness of tone score for each character of the transcript by comparing the tone marking for the one or more pinyins for that character in the second file to the tone determined for the corresponding one or more time-delineated sections of the audio recording; and determining a word-level score for each word in the transcript, the word-level scores being based on the goodness of pronunciation scores and correctness of tone scores.

* * * * *